United States Patent [19]
Knecht

[11] 3,793,685
[45] Feb. 26, 1974

[54] COUPLING APPARATUS FOR THE MOORING OF BOATS OR THE LIKE

[76] Inventor: Hillery G. Knecht, 2766 W 11 Mile, Berkley, Mich. 48072

[22] Filed: Mar. 3, 1971

[21] Appl. No.: 120,477

[52] U.S. Cl............ 24/230 AN, 24/211 L, 114/230, 85/5 B, 339/91 B
[51] Int. Cl...................... A44b 17/00, A44b 11/25
[58] Field of Search.......26/211 R, 230 R, 230 SL, 24/230 AN, 211 L; 285/277, 316, 80; 292/148; 339/91 B; 85/5 B; 114/230

[56] References Cited
UNITED STATES PATENTS

| 3,319,213 | 5/1967 | Mas.................................. 339/91 B |
| 1,260,469 | 3/1918 | Smith................................ 292/148 |
| 2,708,589 | 5/1955 | Masek................................ 285/277 |
| 1,941,856 | 1/1934 | Fraley................................ 285/80 |
| 2,297,548 | 9/1942 | Fox................................... 285/316 |
| 3,081,663 | 3/1963 | Davis................................ 24/211 |
| 3,420,497 | 1/1969 | Wilcox.............................. 285/277 |
| 1,711,771 | 5/1929 | Bourque........................... 24/211 L |
| 3,094,345 | 6/1963 | Gaylord............................ 24/211 L |
| 3,608,962 | 9/1971 | Knecht.............................. 24/211 L |
| 3,631,377 | 12/1971 | Ball................................... 85/5 B |

FOREIGN PATENTS OR APPLICATIONS
1,557,542 4/1970 Germany.............................. 24/211

Primary Examiner—Bernard A. Gelak
Attorney, Agent, or Firm—Lon H. Romanski

[57] ABSTRACT

A coupling apparatus has two sections movable relative to each other for effecting connection and disconnection therebetween; one the the sections includes a generally tubular housing with ball type detent means carried thereby which detents are radially movable with respect to the tubular housing; a plunger-like member within the tubular housing served to hold the ball detents radially outwardly and thereby keep an outer sleeve in a cocked position; the other of the two sections includes a shaft-like extension provided with an annular groove formed near the outer-most end thereof which, when inserted into the tubular housing, is effective for depressing the plunger and having the ball detents move radially inwardly to be at least partly received in the annular groove; the outer sleeve is biased toward a second position whereat it prevents the radial outward movement of the ball detents thereby resulting in the shaft-like extension being securely connected to the tubular housing.

4 Claims, 5 Drawing Figures

PATENTED FEB 26 1974 3,793,685

INVENTOR.
Hillery G. Knecht
BY
Winnie & Romanski
ATTORNEYS

COUPLING APPARATUS FOR THE MOORING OF BOATS OR THE LIKE

BACKGROUND OF THE INVENTION

In many instances it becomes difficult, especially to those who are either of limited dexterity or not mechanically inclined, to effect the necessary motions, etc. to bring about, for example, the swift and safe mooring of a boat to a related docking structure. This often in the past, has required the use of lines or ropes with attendant tying of knots which, more often than not, were not properly made resulting in the creation of free lines after the boat was left unattended.

The invention as herein disclosed and described is directly concerned with the solution of the above as well as other related problems and, in general, addresses itself to the provision of simply actuated mechanical coupling apparatus for the coupling or joining of two related sections relatively movable with respect to each other.

SUMMARY OF THE INVENTION

According to the invention, a coupling apparatus, for the mooring of boats or the like, comprises first and second coupling sections movable relative to each other, said first coupling section comprises a housing, a first passage formed in said housing, at least one detent member carried by said housing, second passage means formed through a wall of said housing as to times permit said detent member to extend into said first passage a predetermined distance, expander means carried by said housing and effective for at times operatively engaging and keeping said detent member from extending into said first passage said predetermined distance, and an outer sleeve member carried by said housing and movable relative thereto, said sleeve having two operating positions, and said second coupling section comprising a shaft-like extension including recess means formed thereon, said shaft-like extension being adapted from insertion into said first passage and for actuation of said expander means whereby said detent member is permitted to extend into said first passage and into said recess means, the first of said two operation positions rendering said sleeve effective for permitting said expander means to move said detent member in a direction away from said first passage, and the second of said two operation positions rendering said sleeve effective for preventing said detent member to be moved out of said recess means thereby preventing said two sections from being disconnected fro each other.

Various objects and advantages of the invention will become apparent when reference is made to the following detailed description considered in conjunction with the accompanying drawings.

DESCRIPTION OF THE DRAWINGS

In the drawings, wherein for purposes of clarity, certain details or elements may be omitted from one or more views.

DESCRIPTION OF THE PREFERRED EMBODIMENTS

Figure 1:
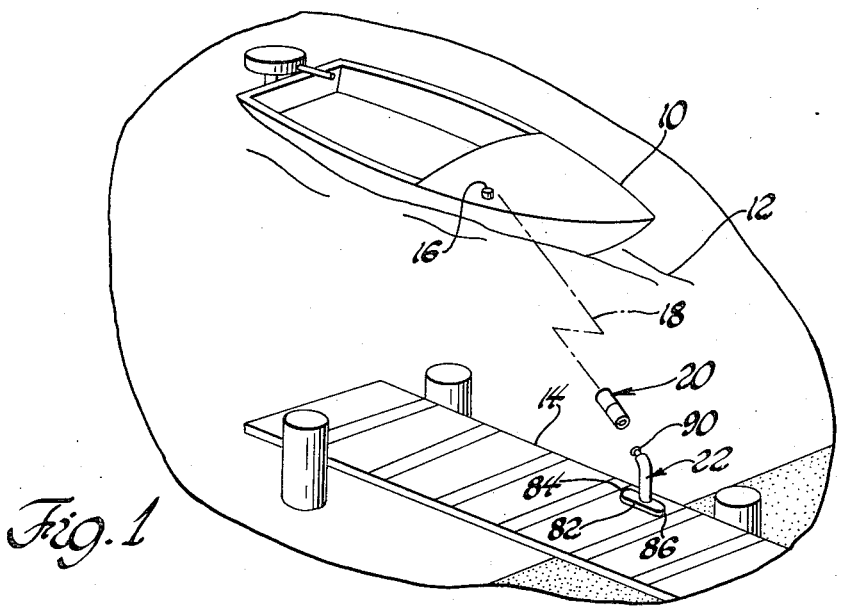
FIG. 1 is a pictorial representation of a boat and docking structure, equipped with a coupling apparatus of the invention, with the boat about to undergo a mooring operation.

Referring now in greater detail to the drawings, FIG. 1 somewhat pictorially illustrates a boat 10 situated in water 12 and approaching a docking structure 14 to which the boat 10 will become moored.

The boat 10 carries a suitable retainer 16 to which is secured a mooring line 18 which, for example, may be a rope of any suitable material. The end of rope line 18 is secured to and carries a quick-disconnect type of coupling device 20, constructed in accordance with the invention, which cooperates with a mooring type anchor 22 secured to the dock 14, in order to thereby moor or secure the boat 10 to the dock 14.

Figure 2:
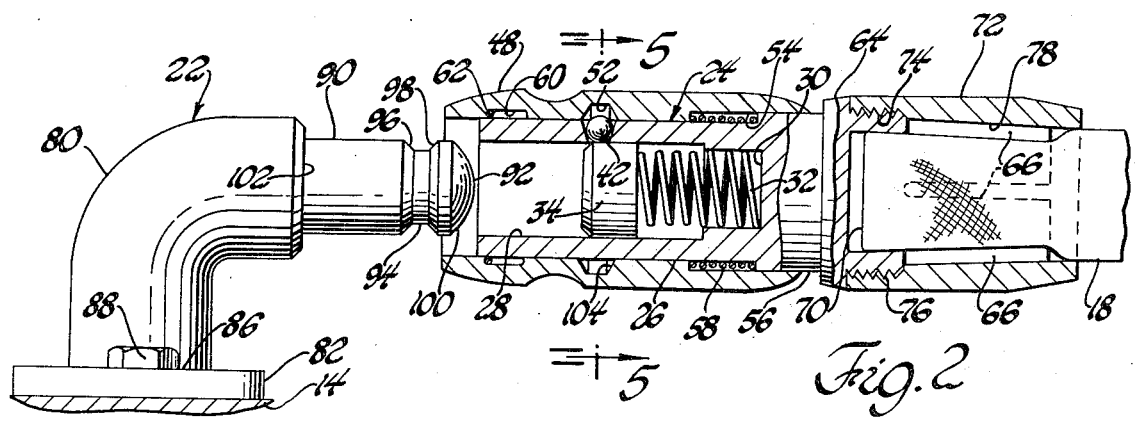
FIG. 2 is an enlarged view of the coupling apparatus of FIG. 1 with portions thereof in axial cross-reaction.

FIG. 2 illustrates the juxtaposed coupling device 20 and mooring anchor 22 as generally respectively comprising female and male type connecting portions. For example, coupling device 20 is illustrated as comprising a main body 24 having an outer cylindrical surface 26 and an inner cylindrical passageway 28 which at its inner end terminates in a cup-like seat 30 for the reception therein of one end of a coiled compression spring 32. A cup-shaped plunger member 34 is slideably received within passageway 28, and in turn, receives therein the other end of spring 32.

Figure 3:
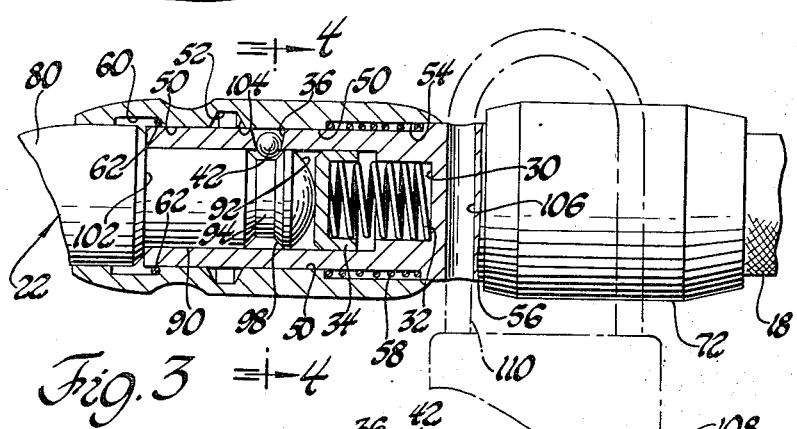
FIG. 3 is a view similar to FIG. 2 but showing the coupling apparatus in a connected condition.
Figure 4:
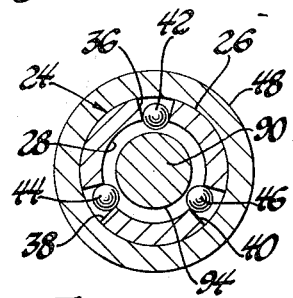
FIG. 4 is a cross-sectional view taken generally on the plane of line 4—4 of FIG. 3 and looking in the direction of the arrows.

The wall of main body 24 has a plurality of angularly spaced generally radially directed apertures 36, 38, and 40 formed therethrough with such apertures having side walls tapering toward each other at the radially inner-most ends thereof. Apertures 36, 38, and 40 respectively receive therein balls 42, 44, and 46 and in so doing generally function as ball seats. However, as best shown in FIGS. 3 and 4, the relative sizes of the balls 42, 44, and 46 and seats or apertures 36, 38, and 40 are such as to at times permit the balls 42, 44, and 46 to extend into the center passageway 28. As will become apparent, such balls 42, 44, and 46 when extended into passageway 28 provide for a locking engagement with the anchor 22.

The axial location of such apertures 36, 38, and 40 is such as to be generally juxtaposed to the plunger 34 whenever plunger 34 is moved to the position as shown in FIG. 2 which can be considered generally as that position determined by the free length of spring 32. Whenever plunger or actuator 34 moves to the position shown in FIG. 2, the diameter of plunger 34 is such as to engage and move balls 42, 44, and 46 radially outwardly, but still within respective apertures 36, 38, and 40, so that the balls 42, 44, and 46 extend some distance beyond the outer cylindrical surface 26 of main body 24.

A generally tubular sleeve 48 has an inner cylindrical surface 50 slideably received about the outer cylindrical surface 26 of main body 24. As shown in FIG. 2, the sleeve 48 has an inner annular groove 52 which, when the sleeve 48 is in its retracted position of FIG. 2, permits the balls 42, 44, and 46 which are extending beyond the outer cylindrical surface 26 of main body 24 to be partly received within the annular recess 52. A shoulder-like groove or counterbore 54 formed in the inner surface of sleeve 48 slides over a cylindrical surface 56 of enlarged diameter formed on the main body 24 and serves to contain a coiled compression spring 58 therein which continually urges the sleeve 48 to the left from the position shown in FIG. 2. A third inner annular recess of groove 60 formed as at near the forward end of sleeve 48 serves to both receive a lock-type ring 62 suitably secured to body member 24 as well as to axially abut thereagainst in order to determine the proper axial position of annular recess 52 when the sleeve 48 is in its retracted position (shown in FIG. 2) and to limit the forward movement of sleeve 48 whith respect to body 24 as depicted in FIG. 3.

The right hand end of main body 24 is formed of a generally thin-walled cup-shaped configuration 64 which preferably includes a plurality of axially or longitudinally extending slots 66 formed therein. The inner clearance or passageway 68 is of a size to receive therein an end 70 of rope line 18. An outer nut 72, provided with an internally threaded portion 74 adapted for threadable engagement with an externally threaded portion 76 formed on the cup-like structure 64, has an inner tapered or conical surface 78 which functions as a camming surface, against the slotted wall portions of cup structure 64, in order to, as it is being threaded onto the cup 64, force the slotted wall portion's thereof radially inwardly thereby squeezing and retaining the end 70 of rope line 18 secured to the connector assembly 20.

Figure also illustrates the male anchor 22 as comprising a main body 80 with a base 82 having laterally extending base portions 84 and 86 through which suitable fastening devices such as screws 88 may pass for securing the anchor to a related structure as, for example, the dock, 14.

A cylindrical probe or shaft portion 90 carried by body 80 extends laterally therefrom and is of outer diameter small enough to, ideally, be closely slideably received within the passageway 28 of main body 24. Spaced some distance axially inwardly of the end 92 of shaft connector 90 is an outer annular groove or recess 94 which, as shown, is preferably provided with annular side walls 96 andd 98. Also, the end 92 is preferably formed to have at least the portion 100 approaching the outer diameter thereof, contoured the benefits of which will become apparent. Althouh not entirely necessary, nevertheless in enhancing the operation of the invention, a shoulder 102 may be formed on member 22 and so spaced relative to groove 94 so that when the left end of main body 24 abuts thereagainst that groove 94 is in position to receive the balls 42, 44, and 46.

OPERATION OF THE INVENTION

When, for example, the boat 10 is approaching docking all that is needed is to first bring the coupling device 20 into general axial alignment with the anchor member 22, as shown in FIG. 2, and to push the connector assembly 20 onto the end of the anchor 22.

As connector assembly 20 and anchor 22 are moved relatively toward each other, end 92 first enters passageway 28 and with further movement abuts against plunger or latch tripping member 34. With further movement, end 92 forces plunger 34 toward the right (as viewed in FIG. 2) relative to the main body 24 against the resilient resistance of spring 32.

Figure 5:
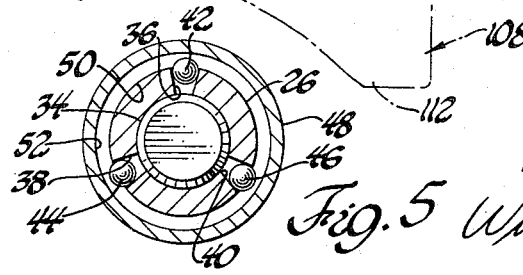
FIG. 5 is a cross-sectional view taken generally on the plane of line 5—5 of FIG. 2 and looking in the direction of the arrows.

After plunger 34 has moved a sufficient distance to the right, balls 42, 44, and 46 are permitted to move radially inwardly from the positions shown in both FIGS. 2 and 5. The tendency for balls 42, 44, and 46 to move radially inwardly is brought about by the combined action of coiled compression spring 58 continually urging the sleeve 48 to the left and the inclined annular surface 104 in groove 52 bearing against balls 42, 44, and 46 with a reactive force directed radially inwardly. Any tendency for the balls 42, 44, and 46 to get caught as between the forward ends of plunger 34 and end 92 of connector extension 90 is avoided as by the contoured surface 100.

When the balls 42, 44, and 46 are thereby permitted to move radially inwardly their maximum amount, anchor extension 90 is so positioned within body 24 as to place the groove 94 in position to partially receive the balls 42, 44, and 46 therein shown in FIG. 3. Of course, as balls 42, 44, and 46 are received by groove 94 of extension 90 they move out of the annular groove 52 in sleeve 48 thereby removing themselves as blocking abutments to the movement of sleeve 48 permitting spring 58 to move the sleeve 48 to the left assuming the position shown in FIG. 3.

Detachment of the mooring or connecting means is easily accomplished by merely moving the sleeve 48 to the right from the position ahown in FIG. 3. That is, for example, if sleeve 48 is grasped and moved toward the right, its initial movement will have no effect in disconnecting the latching assembly 20 from the anchor assembly 22; during such initial movement, spring 58 is undergoing compression thereby creating a force against main body 24 which tends to move the body 24 and balls 42, 44, and 46 to the right. However, an equal and opposite reaction force is developed by the surface 98 against balls 42, 44, and 46 which reaction force prevents the movement of main body 24 to the right. It should also be noted that because of the inclined nature of surface 98 detent balls 42, 44, and 46 also experience a force component of such a reaction force tending to move the detent or latching balls radially outwardly but that such outward movement thereof is precluded by the cylindrical surface 50 of sleeve 48.

When sleeve 48 has been moved sufficiently to the right, the inner annular groove or recess 52 becomes generally radially aligned with detent or locking balls 42, 44, and 46 thereby permitting the previously described force component to move the detent balls radially outwardly into recess 52 and out of engagement with groove 94 in the extension 90. As soon as the detent balls are thereby moved, main body 24 moves to the right relative to extension 90 and plunger 34 moves to the left, relative to main body 24, eventually assuming the position shown in FIG. 2 whereat the outer surface thereof functions to hold the detent balls in the radially outermost positions so as to partially extend into groove 52 and thereby hold the spring biased sleeve 48 in the positions shown in FIG. 2.

As shown in FIG. 3, a clearance passageway 106 may be formed through main body 24 for use with associated locking means as, for example, a key-operated padlock 108. That is, as described above, in order to disconnect the device 20 from anchor 22, aleeve 48 must be moved to the right. Therefore, by passing the padlock hasp 110 through passageway 106 and then locking it in the body 112 the hasp becomes an abutment preventing the unauthorized movement of sleeve 48 in the direction resulting in disconnection of anchor 22 and assembly 20.

In view of the preceding it can be seen that the invention provides apparatus for quickly connecting and disconnecting a movable member, such as the assembly 20, to and from a fixed member, such as the anchor 22. In it application as a mooring means, it eliminates the need for trying to tie lines to an associated docking structure and, at the same time, provides an arrangement whereby such connection once made, can be precluded from unauthorized disconnection.

Although only one embodiment of the invention has been disclosed and described, it is apparent that other embodiments and modifications of the invention are possible within the scope of the appended claims.

I claim:

1. A coupling apparatus, for the mooring of boats or the like, comprising first and second coupling sections movable relative to each other, said first coupling section comprising a housing, a first passage having a forwardly directed open end formed in said housing, at least one detent member carried by said housing, second passage means formed through a wall of said housing as to at times permit said detent member to extend into said first passage a predetermined distance, a piston-like expander means having a radially outer axially extending cylindrical surface, said piston-like expander means being carried by said housing as to have said cylindrical surface slidably guided by and within said first passage and effective for at times operatively engaging and keeping said detent member from extending into said first passage said predetermined distance, an outer radially non-deflectable tubular sleeve member carried by said housing and movable relative thereto along a longitudinal axis of said sleeve member, said outer tubular sleeve member having opposed first and second open ends slidably receiving said housing therethrough, said sleeve being of unitary structure as to have a continuous and uninterrupted cross-sectional configuration when viewed in a plane transverse with respect to the longitudinal axis of said sleeve, said sleeve having a radially outer and axially extending exposed actuating surface adapted for direct manual engagement for manually moving said sleeve axially to one of two operating positions, and said second coupling section comprising a shaft-like extension including generally radially outwardly open first recess means formed thereon, said shaft-like extension being adapted for insertion into said first passage through said forwardly directed opening and for actuation of said piston-like expander means whereby said detent member is permitted to extend into said first passage and into said first recess means, an inner generally radially inwardly open second recess means formed in said sleeve member, only the first of said two operating positions rendering said sleeve effective for permitting said piston-like expander means to move said detent member in a direction away from said first passage, said sleeve being locked against axial movement whenever said piston-like expander means has moved said detent in a direction away from said first passage and at least partly into said radially inwardly open recess means of said sleeve, and the second of said two operating positions rendering said sleeve effective for positively preventing said detent member to be moved out of said recess means thereby preventing said two sections from being disconnected from each other, and spring means carried generally about said housing for continually axially resiliently urging said sleeve from said first of said two operating positions to said second of said two operating positions, said piston-like expander means comprising a cup-like member slideably received within said first passage and having a closed transverse wall portion facing said forwardly directed open end, and second spring means situated generally within said first passage and partly received within said cup-like member for urging said cup-like member toward said forwardly directed open end of said first passage.

2. A coupling apparatus, for the mooring of boats or the like, comprising first and second coupling sections movable relative to each other, said first coupling section comprising a housing, a first passage having a forwardly directed open end formed in said housing, at least one detent member carried by said housing, second passage means formed through a wall of said housing as to at times permit said detent member to extend into said first passage a predetermined distance, piston-like expander means having a radially outer axially extending cylindrical surface, said piston-like expander means being carried by said housing as to have said cylindrical surface slidably guided by and within said first passage and effective for at times operatively engaging and keeping said detent member from extending into said first passage said predetermined distance, an outer radially non-deflectable tubular sleeve member carried by said housing and movable relative thereto along a longitudinal axis of said sleeve member, said outer tubular sleeve member having opposed first and second open ends slidably receiving said housing therethrough, said sleeve being of unitary structure as to have a continuous and uninterrupted cross-sectional configuration when viewed in a plane transverse with respect to the longitudinal axis of said sleeve, said sleeve having a radially outer and axially extending exposed actuating surface adapted for direct manual engagement for manually moving said sleeve axially to one of two operating positions, and said second coupling section comprising a shaft-like extension including generally radially outwardly open first recess means formed thereon, said shaft-like extension being adapted for insertion into said first passage through said forwardly directed opening and for actuation of said piston-like expander means whereby said detent member is permitted to extend into said first passage and into said first recess means, an inner generally radially inwardly open second recess means formed in said sleeve member, only the first of said two operating positions rendering said sleeve effective for permitting said piston-like expander means to move said detent member in a direction away from said first passage, said sleeve being locked against axial movement whenever said piston-like expander means has moved said detent in a direction away from said first passage and at least partly into said radially inwardly open recess means of said sleeve, and the second of said two operating positions rendering said sleeve effective for positively preventing said detent member to be moved out of said recess means thereby preventing said two sections from being disconnected from each other, and spring means carried generally about said housing for continually axially resiliently urging said sleeve from said first of said two operating positions to said second of said two operating positions, and additional means disengageably carried by said housing and adapted for presenting an abutment surface at one end of said outer sleeve member in order to prevent said outer member from moving from said second operating position to said first operating position thereby locking said first coupling section to said second coupling section, said additional means being disengageable from said housing without effecting the magnitude of the resilient force exerted by said spring means against said sleeve member.

3. A coupling apparatus according to claim 2 and further comprising a third passage formed generally transversely of and in said housing, said third passage being capable of accepting therein said additional means in a manner so as to extend a distance sufficiently radially outwardly beyond said housing as to be in the general path of travel of said outer sleeve member as said outer sleeve member is attempted to be moved from said second operating position to said first operating position.

4. A coupling apparatus according to claim 3, wherein said additional means comprises a lock with a hasp portion thereof extending through said third passage.

* * * * *